United States Patent
Tada

(10) Patent No.: US 9,025,790 B2
(45) Date of Patent: May 5, 2015

(54) STRUCTURE FOR INSTALLING LOUDSPEAKER SYSTEM IN VEHICLE

(71) Applicants: Alpine Electronics, Inc., Tokyo (JP); Blueprint Acoustics Pty Ltd., Endeavor Hills, Victoria (AU)

(72) Inventor: Arata Tada, Iwaki (JP)

(73) Assignees: Alpine Electronics, Inc., Tokyo (JP); Blueprint Acoustics Pty Ltd, Endeavour Hills, Victoria (AU)

( * ) Notice: Subject to any disclaimer, the term of this patent is extended or adjusted under 35 U.S.C. 154(b) by 348 days.

(21) Appl. No.: 13/690,608

(22) Filed: Nov. 30, 2012

(65) Prior Publication Data

US 2013/0188806 A1 Jul. 25, 2013

(30) Foreign Application Priority Data

Jan. 24, 2012 (JP) ................................ 2012-011804
Jun. 7, 2012 (JP) ................................ 2012-130075

(51) Int. Cl.
| H04B 1/00 | (2006.01) |
| H04R 1/28 | (2006.01) |
| B60R 11/02 | (2006.01) |
| H04R 1/34 | (2006.01) |

(52) U.S. Cl.
CPC .......... *H04R 1/2803* (2013.01); *B60R 11/0217* (2013.01); *H04R 1/345* (2013.01); *H04R 2499/13* (2013.01)

(58) Field of Classification Search
None
See application file for complete search history.

(56) References Cited

U.S. PATENT DOCUMENTS

| 4,509,184 A * | 4/1985 | Yanagawa ...................... 381/308 |
| 4,953,655 A * | 9/1990 | Furukawa ...................... 181/160 |
| 5,313,525 A | 5/1994 | Klasco |
| 5,737,435 A * | 4/1998 | De Poortere et al. ......... 381/340 |
| 2003/0219137 A1 * | 11/2003 | Fincham ......................... 381/86 |
| 2005/0135642 A1 * | 6/2005 | Dry ................................ 381/302 |
| 2009/0185709 A1 | 7/2009 | Linhard et al. |
| 2013/0142380 A1 * | 6/2013 | Tada ............................. 381/413 |

FOREIGN PATENT DOCUMENTS

| DE | 102006023909 | 7/2007 |
| GB | 2312587 | 10/1997 |
| JP | 04-223697 | 8/1992 |
| JP | H07-177593 | 7/1995 |
| JP | 2005-295334 | 10/2005 |
| WO | WO2011/047435 | 4/2011 |

OTHER PUBLICATIONS

Examination report for European Patent Application No. 12 199 041.0 dated Oct. 13, 2014, 4 pgs.
Extended European Search Report for EP12199041 dated Apr. 24, 2013, 5 pgs.

* cited by examiner

*Primary Examiner* — Thang Tran
(74) *Attorney, Agent, or Firm* — Brinks Gilson & Lione

(57) ABSTRACT

Disclosed is an installation structure for a loudspeaker system in a vehicle, the loudspeaker system being installed in a vehicle front space separated from a vehicle interior by a partition, the vehicle front space being anterior to the vehicle interior, the installation structure including a sound guide port extending through the partition. The sound guide port allows a sound output space of a diaphragm in the loudspeaker system to communicate with front part of the vehicle interior.

15 Claims, 8 Drawing Sheets

STRUCTURE FOR INSTALLING LOUDSPEAKER SYSTEM IN VEHICLE

RELATED APPLICATIONS

The present application claims priority to Japanese Patent Application Number 2012-011804, filed Jan. 24, 2012, and Japanese Patent Application Number 2012-130075, filed Jun. 7, 2012, the entirety of which are hereby incorporated by reference.

BACKGROUND OF THE INVENTION

1. Field of the Invention

The present invention relates to an installation structure for a loudspeaker system in a vehicle, the installation structure enabling an occupant to hear sound emitted from the loudspeaker system as sound coming from the front of the interior of the vehicle (hereinafter, referred to as a "vehicle interior").

2. Description of the Related Art

An in-vehicle loudspeaker system disclosed in Japanese Unexamined Patent Application Publication No. 4-223697 has been known. The in-vehicle loudspeaker system includes a woofer placed under a back seat in a vehicle interior. The woofer is connected to an acoustic tube which extends from the woofer to a space under a dashboard positioned in the front of the vehicle interior. In the in-vehicle loudspeaker system having such a configuration, sound generated from the woofer passes through the acoustic tube and is then output from the space under the dashboard to the vehicle interior. Consequently, an occupant in the vehicle interior can hear low-frequency sound emitted from the woofer as sound coming from the front of the vehicle interior when the woofer is not placed inside the dashboard, in which various instruments and in-vehicle devices, such as a navigation system and an audio system, are arranged, positioned in the front of the vehicle interior.

In the above-described related-art in-vehicle loudspeaker system (or an installation structure for a woofer in a vehicle), however, since the woofer is placed under the back seat in the vehicle interior, the acoustic tube extending from below the back seat to the space under the dashboard in the front of the vehicle interior is long, namely, the acoustic tube has a large-scale structure. Although a loudspeaker system may be installed inside the dashboard, it is difficult to install a low-frequency loudspeaker system inside the dashboard which accommodates instruments and in-vehicle devices, such as a navigation system and an audio system, because such a low-frequency loudspeaker system, particularly, a subwoofer has a large size.

SUMMARY

The present invention has been made in consideration of the above-described circumstances and provides an installation structure for a loudspeaker system in a vehicle, the installation structure enabling an occupant to hear sound emitted from the loudspeaker system as sound coming from the front in a vehicle interior with a simple configuration.

An aspect of the present invention provides an installation structure for a loudspeaker system in a vehicle, the loudspeaker system being installed in a vehicle front space separated from a vehicle interior by a partition, the vehicle front space being anterior to the vehicle interior, the installation structure including a sound guide port extending through the partition, wherein the sound guide port allows a sound output space of a diaphragm in the loudspeaker system to communicate with the front part of the vehicle interior.

This structure permits sound produced by vibrations of the diaphragm in the loudspeaker system installed in the vehicle front space to be guided from the sound output space of the diaphragm through the sound guide port extending through the partition, which separates the vehicle front space from the vehicle interior, to the front part of the vehicle interior. Accordingly, an occupant can hear sound emitted from the loudspeaker system as sound coming from the front of the vehicle interior. Since the vehicle front space accommodating the loudspeaker system is positioned next to the vehicle interior with the partition therebetween, the sound guide port extending through the partition can be made on a relatively small scale.

In this aspect, the installation structure may include an air vent port that allows a back pressure space on the opposite side of the diaphragm from the sound output space in the loudspeaker system to communicate with a space outside the vehicle interior.

This structure permits air to move between the back pressure space on the diaphragm and the space outside the vehicle interior through the air vent port while the diaphragm is vibrating in the loudspeaker system installed in the vehicle front space. Accordingly, sound based on vibrations of the diaphragm is effectively guided through the sound guide port to the front of the vehicle interior without interference with the vibrations of the diaphragm by the air in the back pressure space.

In this aspect, the air vent port extending through a wall separating the vehicle front space from the outside of the vehicle may allow the back pressure space on the opposite side of the diaphragm from the sound output space in the loudspeaker system to communicate with the outside of the vehicle.

This structure permits the air to move between the back pressure space on the diaphragm and the outside of the vehicle through the air vent port extending through the wall separating the vehicle front space from the outside of the vehicle while the diaphragm is vibrating in the loudspeaker system installed in the vehicle front space. Accordingly, sound based on vibrations of the diaphragm is effectively guided through the sound guide port to the front of the vehicle interior without interference with the vibrations of the diaphragm by the air in the back pressure space. Since the vehicle front space accommodating the loudspeaker system is positioned next to the outside of the vehicle with the wall therebetween, the air vent port extending through the wall can be made on a relatively small scale.

In this aspect, the vehicle front space may be an engine compartment that accommodates an engine of the vehicle.

This structure permits sound produced by vibrations of the diaphragm in the loudspeaker system installed in the engine compartment to be guided from the sound output space of the diaphragm to the front part of the vehicle interior through the sound guide port extending through the partition separating the engine compartment from the vehicle interior. Accordingly, an occupant can hear sound emitted from the loudspeaker system as sound coming from the front of the vehicle interior. Since the engine compartment accommodating the loudspeaker system is positioned next to the vehicle interior with the partition therebetween, the sound guide port extending through the partition can be made on a relatively small scale.

In this aspect, the air vent port may extend through a wall separating the engine compartment from a water box of the vehicle so as to allow the engine compartment to communicate with the outside of the vehicle.

This structure permits the air to move between the back pressure space of the diaphragm and the outside of the vehicle through the air vent port extending through the wall separating the engine compartment from the water box while the diaphragm is vibrating in the loudspeaker system installed in the engine compartment. Accordingly, sound based on vibrations of the diaphragm can be effectively guided through the sound guide port to the front of the vehicle interior without interference with the vibrations of the diaphragm by the air in the back pressure space. Since the engine compartment accommodating the loudspeaker system is positioned next to the outside of the vehicle with the wall therebetween, the air vent port extending through the wall can be made on a relatively small scale.

In this aspect, the loudspeaker system may include a first frame disposed on one side of the diaphragm, a second frame disposed on the other side of the diaphragm, the first frame and the second frame being joined, a magnetic circuit having a magnetic gap, the magnetic circuit being fastened to the first frame so as to face the diaphragm, and a voice coil unit including a voice coil, the voice coil unit being fastened to an inner edge of the diaphragm such that the voice coil is positioned in the magnetic gap of the magnetic circuit. Preferably, a space between the diaphragm and the second frame in the loudspeaker system serves as the sound output space and communicates with the front part of the vehicle interior through the sound guide port. A space between the diaphragm and the first frame may serve as the back pressure space and communicate with the space outside the vehicle interior through the air vent port.

This structure permits sound produced by vibrations of the diaphragm in the loudspeaker system installed in the vehicle front space to be guided from the sound output space between the diaphragm and the second frame to the front part of the vehicle interior through the sound guide port extending through the partition separating the vehicle front space from the vehicle interior. Accordingly, an occupant can hear sound emitted from the loudspeaker system as sound coming from the front of the vehicle interior. Moreover, since the air is permitted to move between the space outside the vehicle interior and the back pressure space located between the diaphragm and the first frame through the air vent port while the diaphragm is vibrating in the loudspeaker system, sound based on vibrations of the diaphragm is effectively guided through the sound guide port to the front of the vehicle interior without interference with the vibrations of the diaphragm by the air in the back pressure space.

In this aspect, the loudspeaker system may include a first frame disposed on one side of the diaphragm, a second frame disposed on the other side of the diaphragm, the first frame and the second frame being joined, a magnetic circuit having a magnetic gap, the magnetic circuit being fastened to the first frame so as to face the diaphragm, and a voice coil unit including a voice coil, the voice coil unit being fastened to an inner edge of the diaphragm such that the voice coil is positioned in the magnetic gap of the magnetic circuit. Preferably, a space between the diaphragm and the first frame in the loudspeaker system serves as the sound output space and communicates with the front part of the vehicle interior through the sound guide port. A space between the diaphragm and the second frame may serve as the back pressure space and communicate with the space outside the vehicle interior through the air vent port.

In this structure, since the space between the diaphragm and the first frame, in which the magnetic circuit and the voice coil unit are arranged, communicates with the front part of the vehicle interior through the sound guide port, an increase in temperature of the magnetic circuit and the voice coil unit can be minimized as much as possible. Accordingly, thermal deterioration in characteristics of the magnetic circuit and the voice coil unit can be avoided as much as possible. Thus, high quality sound can be provided to an occupant from the front of the vehicle interior.

DESCRIPTION OF THE PREFERRED EMBODIMENTS

Embodiments of the present invention will be described below with reference to the drawings.

Figure 1:
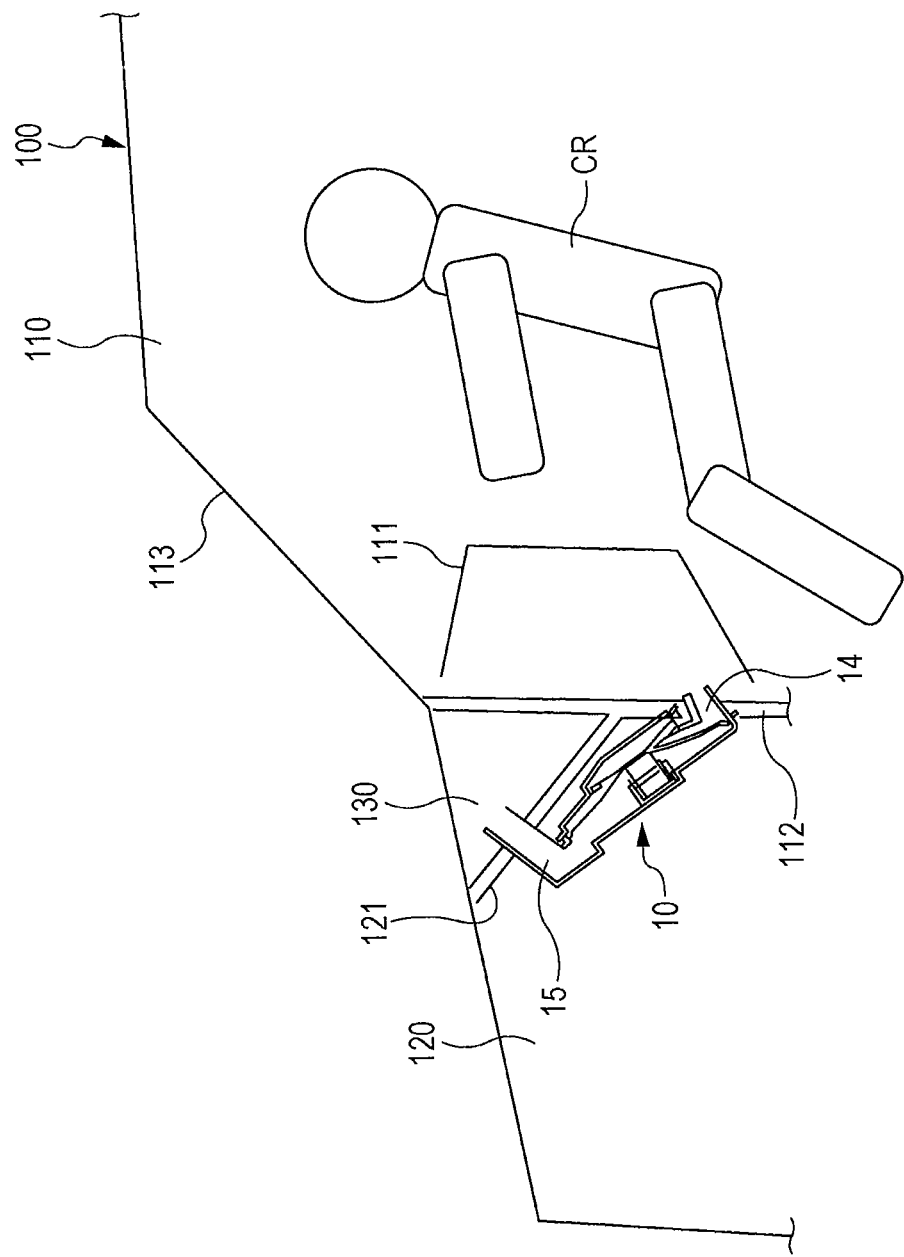
FIG. 1 is a diagram illustrating the basic configuration of an installation structure for a loudspeaker system in a vehicle according to a first embodiment of the present invention.
Figure 2:
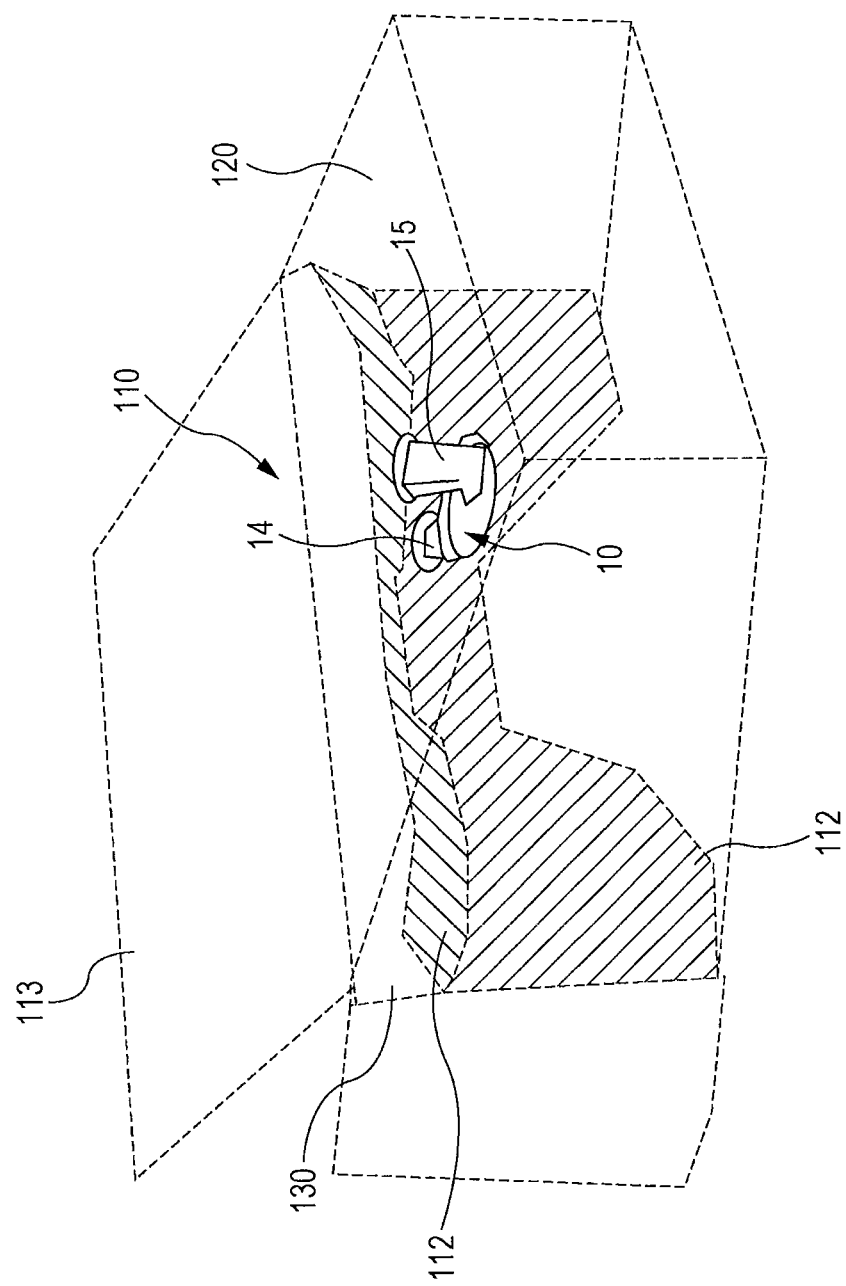
FIG. 2 is a diagram three-dimensionally illustrating an installation position of the loudspeaker system in the installation structure illustrated in FIG. 1.

FIGS. 1 and 2 illustrate an installation structure for a loudspeaker system in a vehicle according to a first embodiment of the present invention. Referring to FIGS. 1 and 2, a vehicle interior 110 is separated from an engine compartment (vehicle front space) 120, which is anterior to the vehicle interior 110 and accommodates an engine, by a fire wall (partition) 112 in a vehicle 100. A water box 130 is placed so as to extend along the lower edge of a windshield 113 and is configured such that water falling down on the windshield 113 is discharged through the water box 130 to the outside of the vehicle. The water box 130 is positioned next to the engine compartment 120. The engine compartment 120 is separated from a space (outside space) in the water box 130 by a wall 121.

The engine compartment 120 accommodates a loudspeaker system 10. The loudspeaker system 10 is secured to the fire wall 112 separating the engine compartment 120 from the vehicle interior 110 and the wall 121 separating the engine compartment 120 from the space in the water box 130 by known components, such as brackets, such that the loudspeaker system 10 is secured to both the fire wall 112 and the wall 121. Although the detailed configuration of the loudspeaker system 10 will be described later, a sound guide port 14 extends from the loudspeaker system 10 through the fire wall 112 such that a free end of the port 14 reaches the inside of a dashboard 111 in the front of the vehicle interior 110. An air vent port 15 extends from the loudspeaker system 10 through the wall 121 such that a free end of the port 15 reaches the space (outside of the vehicle) in the water box 130.

Figure 3:
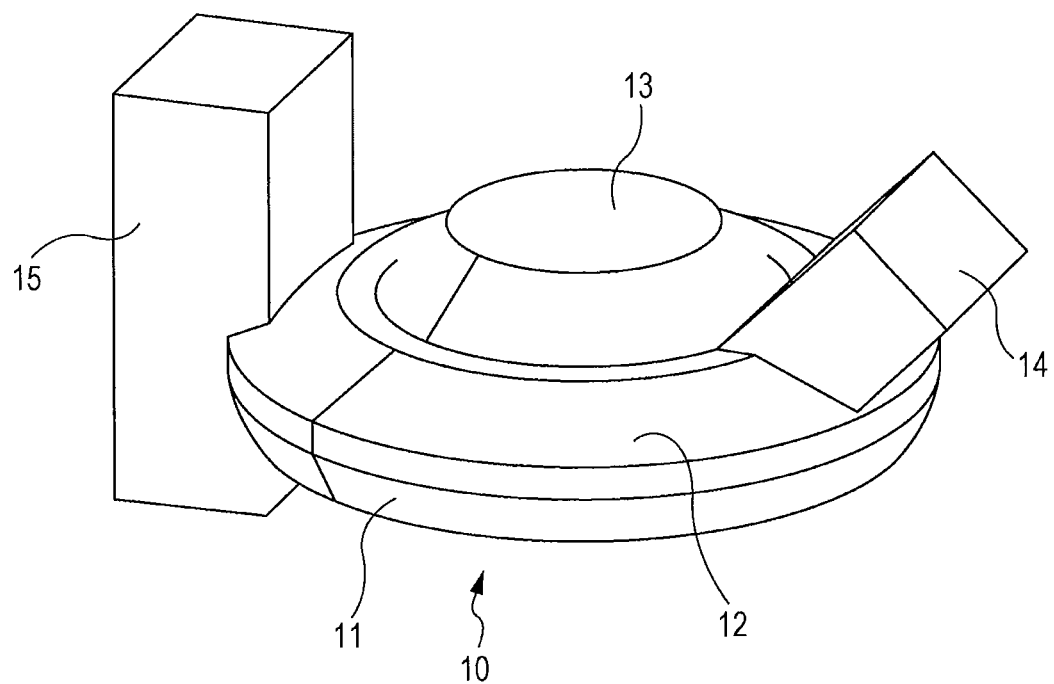
FIG. 3 is a perspective view of the loudspeaker system.
Figure 4:
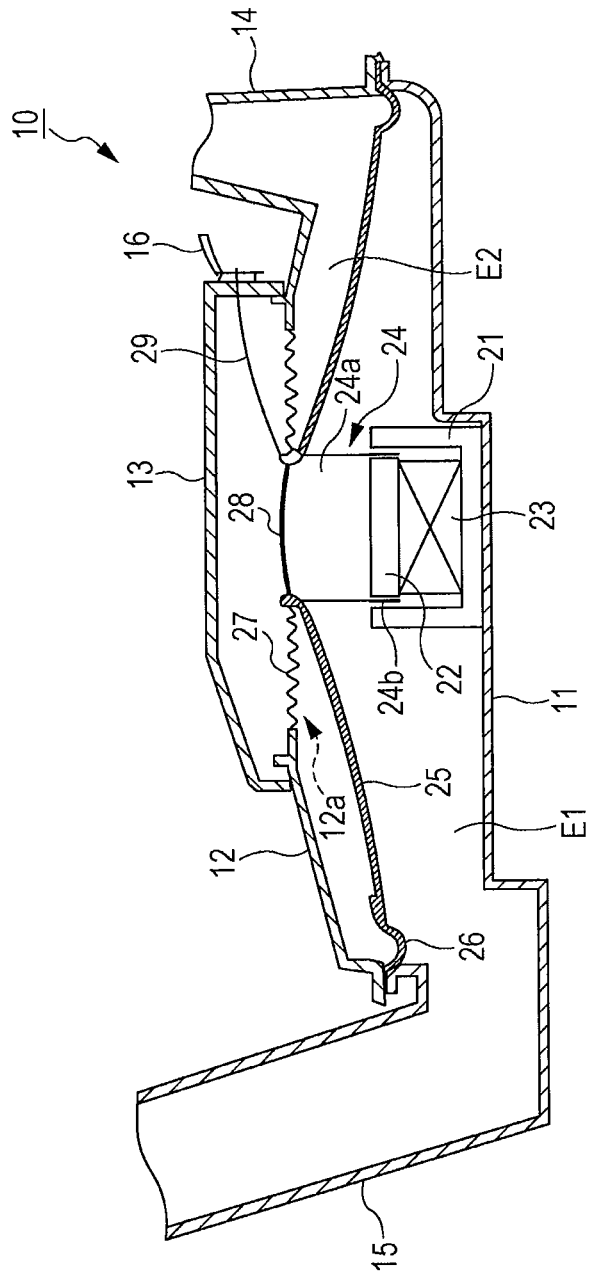
FIG. 4 is a cross-sectional view of the loudspeaker system.

The loudspeaker system 10 is configured as illustrated in FIGS. 3 and 4. Referring to FIGS. 3 and 4, a substantially disk-shaped first frame 11 has a stepped portion at substantially the center of its bottom. An outer yoke 21 is fastened to the bottom of the first frame 11 such that the outer yoke 21 is positioned by the stepped portion. A magnet 23 is sandwiched between the outer yoke 21 and an inner yoke 22. The outer yoke 21, the inner yoke 22, and the magnet 23 are assembled into a magnetic circuit such that an outer circumferential surface of the inner yoke 22 and an inner circumferential surface of the outer yoke 21 facing each other define a gap (magnetic gap). A voice coil unit 24 including a bobbin 24a and a voice coil 24b wound around one end of the bobbin 24a is disposed such that the voice coil 24b is positioned in the magnetic gap between the outer yoke 21 and the inner yoke 22.

A cone-shaped diaphragm 25 is disposed so as to protrude away from the above-described magnetic circuit (the outer yoke 21, the inner yoke 22, and the magnet 23). An outer edge of the diaphragm 25 is attached to an outer edge of the first frame 11 with an edge surround 26. An edge of the other end of the bobbin 24a opposite from the one end with the wound voice coil 24b in the voice coil unit 24 is fastened to an inner edge of the diaphragm 25. The other end, serving as an open end of the bobbin 24a in the voice coil unit 24, is closed by a cap 28.

An outer edge of a second frame 12 is fastened to the outer edge of the first frame 11 such that the edge surround 26 fastened to the diaphragm 25 is sandwiched between these outer edges. The second frame 12 has an opening 12a at the center of its upper surface. The edge of the other end of the bobbin 24a in the voice coil unit 24 and the inner edge of the diaphragm 25 fastened to each other are arranged at substantially the center of the opening 12a. The inner edge of the diaphragm 25 fastened to the edge of the other end of the bobbin 24a is attached to an inner edge of a damper 27. An outer edge of the damper 27 is attached to the rim of the opening 12a of the second frame 12. Consequently, the voice coil unit 24 and the inner edge of the diaphragm 25 are elastically supported by the damper 27 such that the voice coil unit 24 and the inner edge of the diaphragm 25 can vibrate in a direction along the length of the bobbin 24a in the voice coil unit 24.

A cover 13 is fastened to the second frame 12 so as to cover the opening 12a. A terminal 16 is fastened to a predetermined position on an outer circumferential surface of the cover 13. A lead 29 electrically connected to and extending from the voice coil 24b in the voice coil unit 24 extends through a hole (not illustrated) in the cover 13 to the outside of the cover 13 and is connected to the terminal 16. An audio signal is input to the terminal 16, so that a current corresponding to the audio signal flows through the lead 29 to the voice coil 24b.

The first frame 11 is integrated with the air vent port 15 such that the air vent port 15 extends from a predetermined part of a circumferential surface of the first frame 11. A space in the air vent port 15 communicates with a space E1 between the diaphragm 25 and the first frame 11 to which the magnetic circuit (the outer yoke 21, the inner yoke 22, and the magnet 23) is fastened. The second frame 12 is integrated with the sound guide port 14 on the upper surface such that the sound guide port 14 extends from a part opposite the above-described air vent port 15. A space in the sound guide port 14 communicates with a space E2 between the diaphragm 25 and the second frame 12. The space E2 functions as a sound output space, such that sound (acoustic waves) based on vibrations of the diaphragm 25 passes from the space E2 through the sound guide port 14. The space E1 defined by the diaphragm 25 and the first frame 11 functions as a back pressure space, such that air vibrated by vibrations of the diaphragm 25 is permitted to move into and out of the space E1 through the air vent port 15.

The loudspeaker system 10 having such a configuration (refer to FIGS. 3 and 4) is installed in the engine compartment 120 such that the loudspeaker system 10 is positioned next to the fire wall 112 between the engine compartment 120 and the vehicle interior 110 and the wall 121 between the engine compartment 120 and the water box 130 as described above (refer to FIGS. 1 and 2). The sound guide port 14 extends through the fire wall 112 such that the free end thereof reaches the inside of the dashboard 111 in the vehicle interior 110. The sound guide port 14 allows the space E2 (i.e., the sound output space in FIG. 4) between the diaphragm 25 and the second frame 12 in the loudspeaker system 10 to communicate with the space inside the dashboard 111, serving as a front part of the vehicle interior 110. In addition, the air vent port 15 extends through the wall 121 such that the free end thereof reaches the space in the water box 130. The air vent port 15 allows the space E1 (i.e., the back pressure space in FIG. 4) between the diaphragm 25 and the first frame 11 in the loudspeaker system 10 to communicate with the space (outside of the vehicle) in the water box 130.

In the above-described installation structure according to the first embodiment of the present invention, sound produced by vibrations of the diaphragm 25 in the loudspeaker system 10 installed in the engine compartment 120 of the vehicle 100 is guided from the space E2 (or the sound output space) between the diaphragm 25 and the second frame 12 through the sound guide port 14 extending through the fire wall 112 separating the engine compartment 120 from the vehicle interior 110 to the inside of the dashboard 111 (the front part of the vehicle interior). Accordingly, an occupant CR can hear sound emitted from the loudspeaker system 10 as sound coming from the inside of the dashboard 111 in the front of the vehicle interior 110. While the diaphragm 25 is vibrating in the loudspeaker system 10, the air is permitted to move between the space E1 (or the back pressure space), located between the diaphragm 25 and the first frame 11, and the outside of the vehicle through the air vent port 15 extending through the wall 121 separating the engine compartment 120 from the space (outside of the vehicle) in the water box 130. Advantageously, sound based on vibrations of the diaphragm 25 is effectively guided to the inside of the dashboard 111 in the vehicle interior 110 (i.e., the front of the vehicle interior) through the sound guide port 14 without interference with the vibrations of the diaphragm 25 by the air in the space E1 (the back pressure space). Accordingly, the occupant CR can clearly hear sound emitted from the loudspeaker system 10 as sound coming from the front of the vehicle interior 110.

According to the above-described installation structure, since the loudspeaker system 10 is installed not in the vehicle interior 110 but in the engine compartment 120, the space in the vehicle interior 110 is not reduced by the loudspeaker system 10 and/or a mechanism for guiding sound from the loudspeaker system 10 to the front of the vehicle interior 110. Furthermore, since the engine compartment 120 is next to the vehicle interior 110, the sound guide port 14 extending from the loudspeaker system 10 through the fire wall 112 to the front part of the vehicle interior 110 does not need to be made long. Moreover, since the engine compartment 120 is also next to the water box 130, the air vent port 15 extending from the loudspeaker system 10 through the wall 121 to the space in the water box 130 does not need to be made long. Consequently, a mechanism for allowing the loudspeaker system 10 to communicate with the front part of the vehicle interior 110 and a mechanism for allowing the loudspeaker system 10 to communicate with the outside of the vehicle can be made on a relatively small scale. Accordingly, such a simple configuration enables the occupant CR to hear sound emitted from the loudspeaker system 10 as sound coming from the front of the vehicle interior 110.

Figure 5:
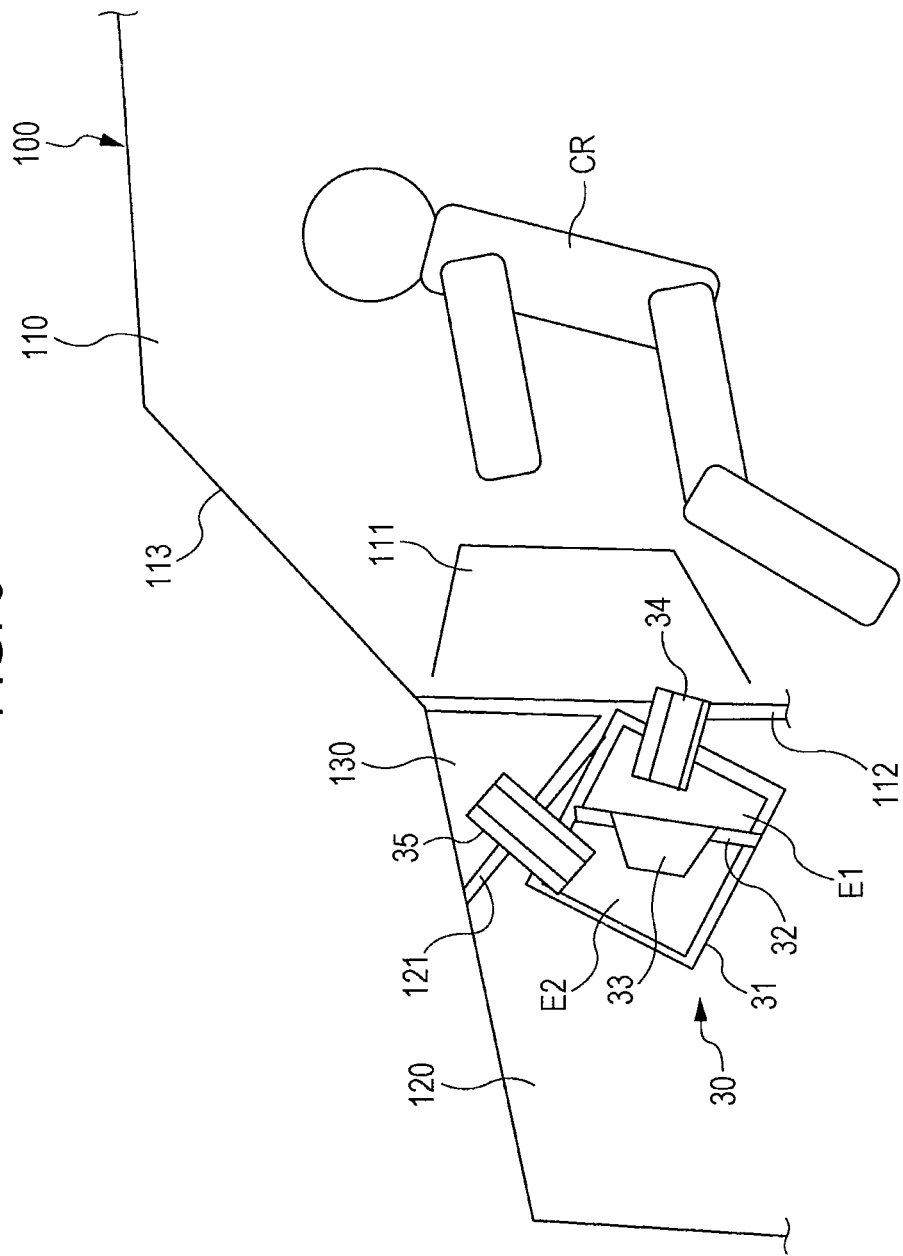
FIG. 5 is a diagram illustrating the basic configuration of an installation structure for a loudspeaker system in a vehicle according to a second embodiment of the present invention.

FIG. 5 illustrates an installation structure for a loudspeaker system according to a second embodiment of the present invention. The installation structure for the loudspeaker system according to the second embodiment differs from that according to the first embodiment in the configuration of the loudspeaker system.

Referring to FIG. 5, the loudspeaker system, indicated at 30, is secured in the engine compartment 120 so as to be positioned next to both the fire wall 112 separating the engine compartment 120 from the vehicle interior 110 and the wall 121 separating the engine compartment 120 from the space in the water box 130. The loudspeaker system 30 is configured such that a space in an enclosure 31 is divided into two spaces E1 and E2 by a divider 32. A loudspeaker unit 33 is fastened to the divider 32 so as to emit sound to the space E1. Since the loudspeaker unit 33 is fastened to the divider 32 in this manner, the space E1 to which sound from the loudspeaker unit 33 is pointed functions as a sound output space, and the space E2 on the opposite side of the divider 32 from the space E1 functions as a back pressure space. The enclosure 31 is provided with a sound guide port 34 extending from the space E1 (the sound output space) and an air vent port 35 extending from the space E2 (the back pressure space). The sound guide port 34 extending from the loudspeaker system 30 extends through the fire wall 112 such that one end thereof reaches the inside of the dashboard 111 in the vehicle interior 110. The air vent port 35 extending from the loudspeaker system 30 extends through the wall 121 such that one end thereof reaches the space in the water box 130.

In the above-described installation structure according to the second embodiment of the present invention, sound emitted from the loudspeaker unit 33 to the space E1 (the sound output space) at the front of the loudspeaker unit 33 in the enclosure 31 of the loudspeaker system 30 is guided to the inside of the dashboard 111 (the front part of the vehicle interior) through the sound guide port 34 extending through the fire wall 112. Accordingly, the occupant CR can hear the sound emitted from the loudspeaker system 10 as sound coming from the inside of the dashboard 111 in the front of the vehicle interior 110. While sound is output by vibrations of a diaphragm in the loudspeaker unit 33, air is permitted to move between the space E2 (the back pressure space) at the rear of the loudspeaker unit 33 in the enclosure 31 and the outside of the vehicle through the air vent port 35 extending through the wall 121 separating the engine compartment 120 from the space (outside of the vehicle) in the water box 130. Accordingly, sound emitted from the loudspeaker unit 33 is effectively guided through the sound guide port 34 to the inside of the dashboard 111 in the vehicle interior 110 (or the front of the vehicle interior) without interference from the air at the rear of the loudspeaker unit 33. The occupant CR can therefore clearly hear sound emitted from the loudspeaker system 30 as sound coming from the front of the vehicle interior 110.

In this case, since the loudspeaker system 30 is installed in the engine compartment 120 next to the vehicle interior 110, the sound guide port 34 extending from the loudspeaker system 30 in the engine compartment 120 through the fire wall 112 to the vehicle interior 110 and the air vent port 35 extending from the loudspeaker system 30 through the wall 121 to the space in the water box 130 do not have to be made longer. Accordingly, a mechanism for allowing the loudspeaker system 30 to communicate with the front part of the vehicle interior 110 and a mechanism for allowing the loudspeaker system 30 to communicate with the outside of the vehicle can be made on a relatively small scale. Such a simple configuration therefore enables the occupant CR to hear sound emitted from the loudspeaker system 30 as sound coming from the front of the vehicle interior 110.

In the above-described embodiments of the present invention, the loudspeaker system 10 (30) is installed in the engine compartment 120 positioned anterior to the vehicle interior 110. In a vehicle of a type in which the engine is placed in the rear of the vehicle 100, e.g., a mid-engine rear-drive vehicle or a rear-engine rear-drive vehicle, the loudspeaker system 10 (30) is placed in a vehicle front space anterior to the vehicle interior 110 that does not accommodate the engine and is used as, for example, a trunk.

Furthermore, for example, if the space E2 at the rear of the loudspeaker unit 33 has such a large capacity that back pressure caused by the diaphragm in the loudspeaker unit 33 can be absorbed in the second embodiment (refer to FIG. 5), the air vent port 35 may be eliminated.

Figure 6:
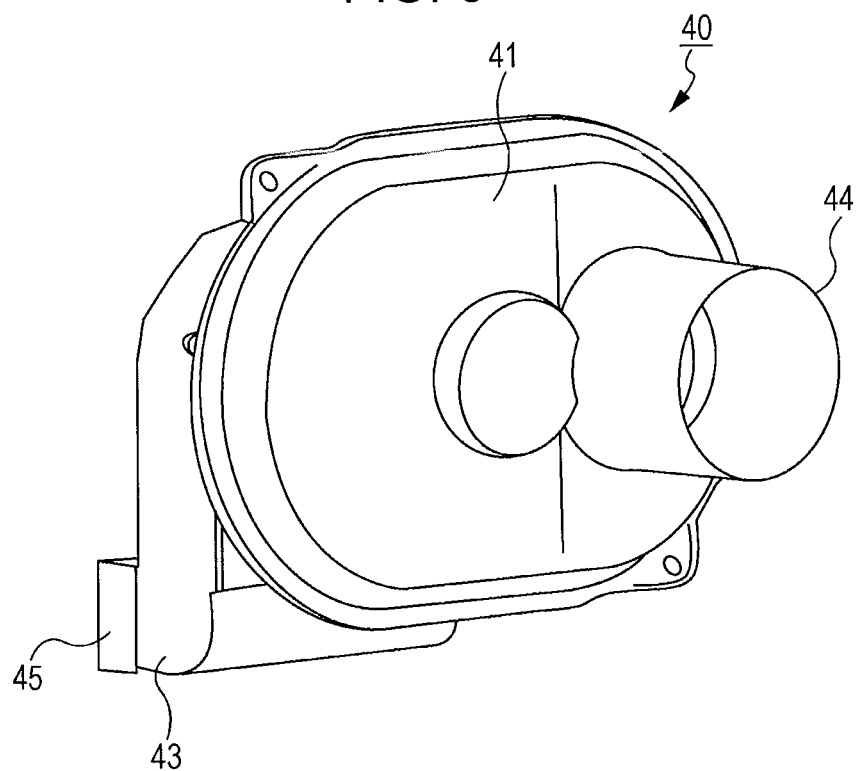
FIG. 6 is a perspective view of another loudspeaker system installable in a vehicle with the installation structure according to the first embodiment of the present invention.
Figure 7:
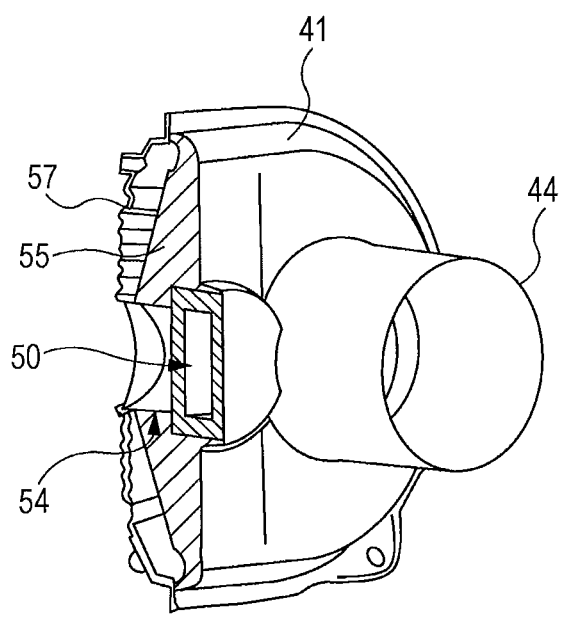
FIG. 7 is a cutaway perspective view of the loudspeaker system of FIG. 6.
Figure 8:
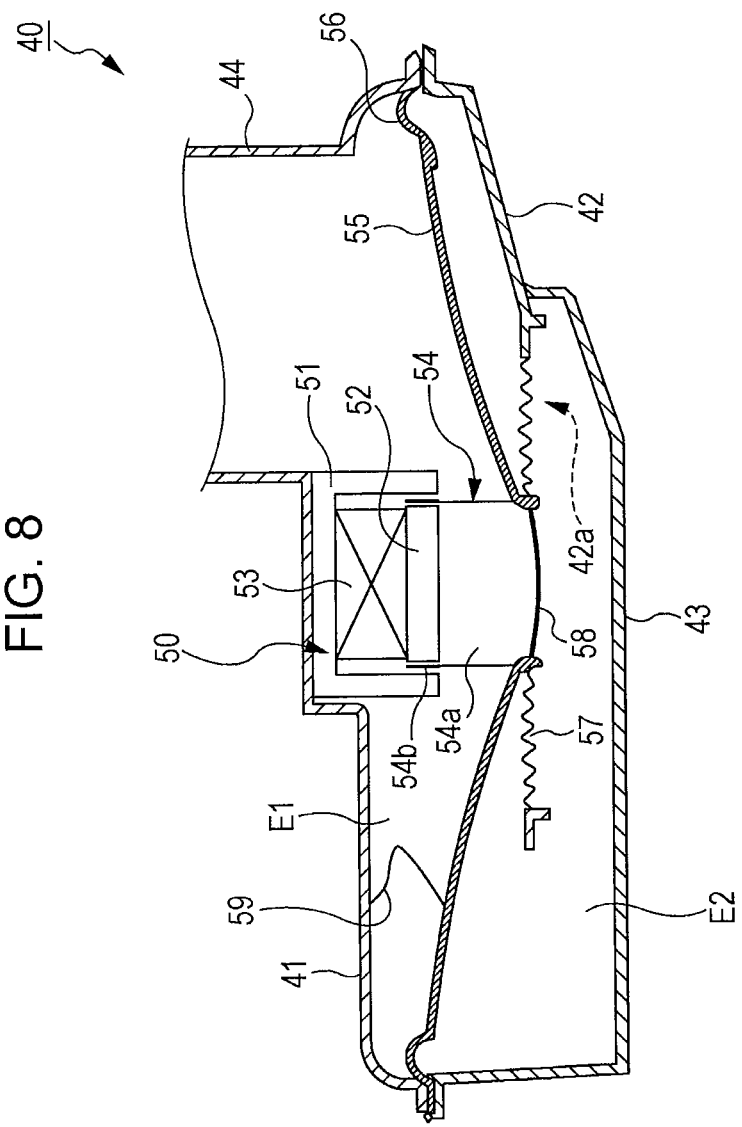
FIG. 8 is a cross-sectional view of the loudspeaker system of FIG. 6.

Furthermore, a loudspeaker system 40 having a configuration illustrated in FIGS. 6 to 8 may be used instead of the loudspeaker system 10 having the configuration illustrated in FIGS. 3 and 4 installed in the vehicle with the installation structure according to the above-described first embodiment.

In the loudspeaker system 40 illustrated in FIGS. 6 to 8, a magnetic circuit 50 including an outer yoke 51, an inner yoke 52, and a magnet 53 is fastened such that the magnetic circuit 50 is positioned by a stepped portion at substantially the center of a first frame 41 in a manner similar to the loudspeaker system 10 illustrated in FIGS. 3 and 4. In addition, a voice coil unit 54 is disposed such that a voice coil 54b wound around one end of a bobbin 54a is positioned in a magnetic gap (i.e., the gap between the outer yoke 51 and the inner yoke 52) in the magnetic circuit 50. A cone-shaped diaphragm 55 is placed so as to protrude away from the magnetic circuit 50. An outer edge of the diaphragm 55 is attached to an outer edge of the first frame 41 with an edge surround 56. An edge of the other end of the bobbin 54a opposite from the one end with the wound voice coil 54b is fastened to an inner edge of the diaphragm 55. The other end, serving as an open end of the bobbin 54a, is closed by a cap 58.

A second frame 42 and a cover 43 are integrated into a frame unit. The second frame 42 and the cover 43 are joined to the first frame 41 such that the edge surround 56 fastened to the diaphragm 55 is sandwiched by outer edges of the second frame 42 and the cover 43 and the outer edge of the first frame 41. The second frame 42 has an opening 42a in a portion covered with the cover 43. The inner edge of the diaphragm 55 to which the edge of the other end of the bobbin 54a of the voice coil unit 54 is fastened is positioned at substantially the center of the opening 42a. The inner edge of the diaphragm 55 fastened to the edge of the other end of the bobbin 54a is attached to an inner edge of a damper 57. An outer edge of the damper 57 is attached to the rim of the opening 42a in the second frame 42. Consequently, the voice coil unit 54 and the inner edge of the diaphragm 55 are elastically supported by the damper 57 such that the voice coil unit 54 and the inner edge of the diaphragm 55 can vibrate in the direction along the length of the bobbin 54a.

A lead 59 electrically connected to and extending from the voice coil 54b extends through a hole (not illustrated) in the first frame 41 to the outside of the first frame 41. An audio signal is supplied through the lead 59 to the voice coil 54b.

The first frame 41 is provided with a sound guide port 44 extending from a predetermined part in the vicinity of a circumferential surface of the first frame 41. A space in the sound guide port 44 communicates with the space E1 between the diaphragm 55 and the first frame 41 to which the magnetic circuit 50 is fastened. In the frame unit composed of the second frame 42 and the cover 43, the cover 43 is provided with an air vent port 45 (not illustrated in FIGS. 7 and 8) positioned on its outer surface such that the air vent port 45 extends from a part opposite the above-described sound guide port 44 as illustrated in FIG. 6. A space in the air vent port 45 communicates with the space E2 defined by the diaphragm 55, the second frame 42, and the cover 43.

The above-described space E1 between the first frame 41 and the diaphragm 55 functions as a sound output space such that sound (acoustic waves) based on vibrations of the diaphragm 55 passes from the space E1 through the sound guide port 44. Additionally, the space E2 defined by the diaphragm 55, the second frame 42, and the cover 43 functions as a back pressure space such that the air vibrated by vibrations of the diaphragm 55 is permitted to move into and out of the space E2 through the air vent port 45.

Figure 9:
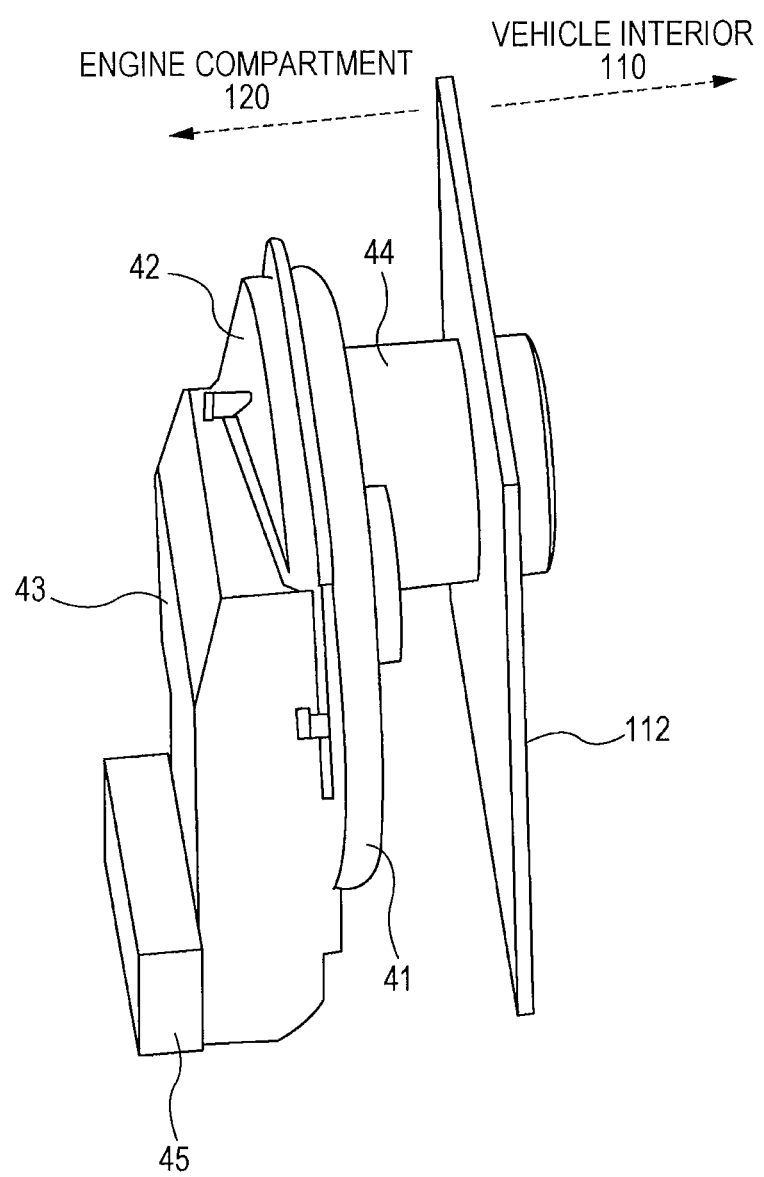
FIG. 9 is a perspective view of the installation structure for the loudspeaker system of FIG. 6.

The loudspeaker system 40 having the above-described configuration (refer to FIGS. 6 to 8) is installed in the engine compartment 120 as schematically illustrated in FIG. 9. The sound guide port 44 extends from the first frame 41 through the fire wall 112 such that a free end of the sound guide port 44 reaches the inside of the dashboard 111 in the vehicle interior 110 (refer to FIG. 1). The sound guide port 44 allows the space E1 (i.e., the sound output space in FIG. 8) between the diaphragm 55 and the first frame 41 in the loudspeaker system 40 to communicate with the space inside the dashboard 111, serving as a front part of the vehicle interior 110. In addition, the air vent port 45 extending from the cover 43 integrated with the second frame 42 reaches the space (e.g., the water box 130) outside the vehicle interior 110. The air vent port 45 allows the space E2 (i.e., the back pressure space in FIG. 8) between the diaphragm 55 and the frame unit composed of the second frame 42 and the cover 43 in the loudspeaker system 40 to communicate with the space outside the vehicle interior 110.

Since the loudspeaker system 40 is installed in the engine compartment 120 as described above, sound produced by vibrations of the diaphragm 55 in the loudspeaker system 40 installed in the engine compartment 120 (the vehicle front space) is guided through the sound guide port 44 to the inside of the dashboard 111 in the vehicle interior 110. Accordingly, the occupant CR in the vehicle interior 110 can hear sound emitted from the loudspeaker system 40 as sound coming from the front of the vehicle interior 110. Since the engine compartment 120 accommodating the loudspeaker system 40 is positioned next to the vehicle interior 110 with the fire wall 112 therebetween, the sound guide port 44 extending through the fire wall 112 can be made on a relatively small scale.

Additionally, the space E1 between the diaphragm 55 and the first frame 41, in which the magnetic circuit 50 (the outer yoke 51, the inner yoke 52, and the magnet 53) and the voice coil unit 54 (the bobbin 54a and the voice coil 54b) are arranged, communicates with the vehicle interior 110 through the sound guide port 44. Although the loudspeaker system 40 is installed in the engine compartment 120, an increase in temperature of the magnetic circuit 50 and the voice coil unit 54 can be minimized as much as possible. Accordingly, thermal deterioration in characteristics of the magnetic circuit 50 and the voice coil unit 54 can be avoided as much as possible. Thus, high quality sound can be provided to the vehicle interior 110.

Advantageously, the installation structure for the loudspeaker system in the vehicle according to each embodiment of the present invention enables an occupant to hear sound emitted from the loudspeaker system as sound coming from the front of the vehicle interior with a simple configuration. It is therefore useful as an installation structure for a loudspeaker system in a vehicle.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An installation structure and loudspeaker system for installation in a vehicle front space separated from a vehicle interior by a partition, the vehicle front space being anterior to the vehicle interior, the installation structure and loudspeaker system comprising:
   a sound guide port configured for extending through the partition,
   wherein the sound guide port is configured to allow a sound output space of a diaphragm in the loudspeaker system to communicate with a front part of the vehicle interior; and
   an air vent port communicating with a back pressure space on the opposite side of the diaphragm from the sound output space in the loudspeaker system and configured to communicate with a water box of the vehicle as a space outside the vehicle interior.

2. The installation structure and loudspeaker system according to claim 1, wherein the vehicle front space is an engine compartment that accommodates an engine of the vehicle.

3. The installation structure and loudspeaker system according to claim 1, wherein the air vent port is configured for extending through a wall separating the vehicle front space from the outside of the vehicle to allow the back pressure space on the opposite side of the diaphragm from the sound output space in the loudspeaker system to communicate with the outside of the vehicle.

4. The installation structure and loudspeaker system according to claim 3, wherein the vehicle front space is an engine compartment that accommodates an engine of the vehicle.

5. The installation structure and loudspeaker system according to claim 4, wherein the air vent port is configured to extend through a wall separating the engine compartment from the water box of the vehicle so as to allow the engine compartment to communicate with the outside of the vehicle.

6. The installation structure and loudspeaker system according to claim 1,
   wherein the loudspeaker system includes:
      a first frame disposed on one side of the diaphragm;
      a second frame disposed on the other side of the diaphragm, the first frame and the second frame being joined;
      a magnetic circuit having a magnetic gap, the magnetic circuit being fastened to the first frame so as to face the diaphragm; and a voice coil unit including a voice coil, the voice coil unit being fastened to an inner edge of the diaphragm such that the voice coil is positioned in the magnetic gap of the magnetic circuit, wherein a space between the diaphragm and the second frame in the loudspeaker system serves as the sound output space and is configured to communicate with the front part of the vehicle interior through the sound guide port, and wherein a space between the diaphragm and the first frame serves as the back pressure space and is configured to communicate with the space outside the vehicle interior through the air vent port.

7. The installation structure and loudspeaker system according to claim 1,
    wherein the loudspeaker system includes:
        a first frame disposed on one side of the diaphragm;
        a second frame disposed on the other side of the diaphragm, the first frame and the second frame being joined;
        a magnetic circuit having a magnetic gap, the magnetic circuit being fastened to the first frame so as to face the diaphragm; and
        a voice coil unit including a voice coil, the voice coil unit being fastened to an inner edge of the diaphragm such that the voice coil is positioned in the magnetic gap of the magnetic circuit,
    wherein a space between the diaphragm and the first frame in the loudspeaker system serves as the sound output space and is configured to communicate with the front part of the vehicle interior through the sound guide port, and
    wherein a space between the diaphragm and the second frame serves as the back pressure space and is configured to communicate with the space outside the vehicle interior through the air vent port.

8. The installation structure and loudspeaker system according to claim 3,
    wherein the loudspeaker system includes:
        a first frame disposed on one side of the diaphragm;
        a second frame disposed on the other side of the diaphragm, the first frame and the second frame being joined;
        a magnetic circuit having a magnetic gap, the magnetic circuit being fastened to the first frame so as to face the diaphragm; and
        a voice coil unit including a voice coil, the voice coil unit being fastened to an inner edge of the diaphragm such that the voice coil is positioned in the magnetic gap of the magnetic circuit,
    wherein a space between the diaphragm and the second frame in the loudspeaker system serves as the sound output space and is configured to communicate with the front part of the vehicle interior through the sound guide port, and
    wherein a space between the diaphragm and the first frame serves as the back pressure space and is configured to communicate with the outside of the vehicle through the air vent port.

9. The installation structure and loudspeaker system according to claim 3,
    wherein the loudspeaker system includes:
        a first frame disposed on one side of the diaphragm;
        a second frame disposed on the other side of the diaphragm, the first frame and the second frame being joined;
        a magnetic circuit having a magnetic gap, the magnetic circuit being fastened to the first frame so as to face the diaphragm; and
        a voice coil unit including a voice coil, the voice coil unit being fastened to an inner edge of the diaphragm such that the voice coil is positioned in the magnetic gap of the magnetic circuit,
    wherein a space between the diaphragm and the first frame in the loudspeaker system serves as the sound output space and is configured to communicate with the front part of the vehicle interior through the sound guide port, and
    wherein a space between the diaphragm and the second frame serves as the back pressure space and is configured to communicate with the outside of the vehicle through the air vent port.

10. An installation structure and loudspeaker system for installation in a vehicle engine compartment separated from a vehicle interior by a partition, the installation structure and loudspeaker system comprising:
    a sound guide port configured for extending through the partition, wherein the sound guide port is configured to allow a sound output space of a diaphragm in the loudspeaker system to communicate with a part of the vehicle interior; and
    an air vent port communicating with a back pressure space on the opposite side of the diaphragm from the sound output space in the loudspeaker system and configured to communicate with a water box of the vehicle as a space outside the vehicle interior.

11. The installation structure and loudspeaker system according to claim 10, wherein the air vent port is configured for extending through a wall separating the vehicle engine compartment from the water box to allow the back pressure space on the opposite side of the diaphragm from the sound output space in the loudspeaker system to communicate with the outside of the vehicle.

12. The installation structure and loudspeaker system according to claim 10,
    wherein the loudspeaker system includes:
        a first frame disposed on one side of the diaphragm;
        a second frame disposed on the other side of the diaphragm, the first frame and the second frame being joined;
        a magnetic circuit having a magnetic gap, the magnetic circuit being fastened to the first frame so as to face the diaphragm; and
        a voice coil unit including a voice coil, the voice coil unit being fastened to an inner edge of the diaphragm such that the voice coil is positioned in the magnetic gap of the magnetic circuit,
    wherein a space between the diaphragm and the second frame in the loudspeaker system serves as the sound output space and is configured to communicate with the part of the vehicle interior through the sound guide port, and
    wherein a space between the diaphragm and the first frame serves as the back pressure space and is configured to communicate with the space outside the vehicle interior through the air vent port.

13. The installation structure and loudspeaker system according to claim 10,
    wherein the loudspeaker system includes:
        a first frame disposed on one side of the diaphragm;
        a second frame disposed on the other side of the diaphragm, the first frame and the second frame being joined;

a magnetic circuit having a magnetic gap, the magnetic circuit being fastened to the first frame so as to face the diaphragm; and a voice coil unit including a voice coil, the voice coil unit being fastened to an inner edge of the diaphragm such that the voice coil is positioned in the magnetic gap of the magnetic circuit, wherein a space between the diaphragm and the first frame in the loudspeaker system serves as the sound output space and is configured to communicate with the part of the vehicle interior through the sound guide port, and wherein a space between the diaphragm and the second frame serves as the back pressure space and is configured to communicate with the space outside the vehicle interior through the air vent port.

14. An installation structure and loudspeaker system for installation in an engine compartment of a vehicle separated from a vehicle interior by a partition, the engine compartment being anterior to the vehicle interior, the installation structure and loudspeaker system comprising:

a sound guide port configured for extending through the partition, wherein the sound guide port is configured to allow a sound output space of a diaphragm in the loudspeaker system to communicate with the vehicle interior; and an air vent port communicating with a back pressure space on the opposite side of the diaphragm from the sound output space in the loudspeaker system and configured to communicate with a water box of the vehicle as a space outside the vehicle interior.

15. The installation structure and loudspeaker system according to claim 14, wherein the air vent port is configured to extend through a wall separating the engine compartment from the water box of the vehicle.

* * * * *